US009625566B2

(12) United States Patent
Broad (10) Patent No.: US 9,625,566 B2
(45) Date of Patent: Apr. 18, 2017

(54) DIRECT GEOLOCATION FROM TDOA, FDOA AND AGL

(71) Applicant: John T. Broad, Aberdeen, MD (US)

(72) Inventor: John T. Broad, Aberdeen, MD (US)

(73) Assignee: Raytheon Company, Waltham, MA (US)

( * ) Notice: Subject to any disclaimer, the term of this patent is extended or adjusted under 35 U.S.C. 154(b) by 472 days.

(21) Appl. No.: 14/283,826

(22) Filed: May 21, 2014

(65) Prior Publication Data

US 2016/0299212 A1    Oct. 13, 2016

(51) Int. Cl.
    *G01S 5/04*     (2006.01)
    *G01S 5/12*     (2006.01)

(52) U.S. Cl.
    CPC . *G01S 5/04* (2013.01); *G01S 5/12* (2013.01)

(58) Field of Classification Search
    CPC ........................................................ G01S 5/04
    USPC ......................................................... 342/465
    See application file for complete search history.

(56) References Cited

U.S. PATENT DOCUMENTS

| | | |
|---|---|---|
| 5,327,144 A | 7/1994 | Stilp et al. |
| 5,570,099 A | 10/1996 | DeJardins |
| 5,874,916 A | 2/1999 | Desiardins |
| 6,876,859 B2 | 4/2005 | Anderson et al. |
| 8,004,459 B2 | 8/2011 | Ho et al. |
| 8,081,111 B2 | 12/2011 | Haworth |
| 8,134,493 B2 | 3/2012 | Noble et al. |
| 2007/0120738 A1* | 5/2007 | Stroud ............ G01S 5/06 342/387 |
| 2009/0224957 A1* | 9/2009 | Chung ............ G01S 5/12 342/29 |
| 2010/0315290 A1* | 12/2010 | Grabbe ............ G01S 5/12 342/386 |

OTHER PUBLICATIONS

Chestnut, "Emitter Location Accuracy Using TDOA and Differential Doppler" IEEE Transactions on Aerospace and Electronic Systems, IEEE Service Center Piscataway, NJ, US, vol. AES-18, No. 2, Mar. 1, 1982, pp. 214-218, XP001007484, ISSN: 0018-9251, DOI: 10.1109/TAES.1982.309230.*

(Continued)

*Primary Examiner* — Tashiana Adams
*Assistant Examiner* — Helena Seraydaryan
(74) *Attorney, Agent, or Firm* — Burns & Levinson LLP; Joseph M. Maraia (57) ABSTRACT

A direct geolocation approach for estimating a location of a stationary emitter located on the Earth surface is provided. The approach uses data collected during a plurality of time periods including Time Difference of Arrival (TDOA) and Frequency Difference of Arrival (FDOA) measurements of a radar pulse sent from the emitter, and altitude measurements of an aircraft above the Earth surface. The approach includes estimating a location of the emitter for each of the time periods based on the TDOA, FDOA, and altitude measurements associated with a respective time period. The estimated location of the stationary emitter includes possible longitude and latitude of the emitter. The approach further includes averaging the estimated locations associated with the plurality of time periods to form an averaged estimated location of the emitter. A convenient example of the approach computes the location of the emitter based on the averaged estimated location.

17 Claims, 9 Drawing Sheets

(56) References Cited

OTHER PUBLICATIONS

Svante et al, "A Review of Time-Delay Estimation Techniques"; Control & Communication; Department of Electrical Engineering; Linkopings Universitet, SE 581 83 Linkoping, Sweden, Dec. 30, 2003; "http://www.control.isy.se/publications".*

Paul C. Chestnut; "Emitter Location Accuracy Using TDOA and Differential Doppler"; IEEE Transactions on Aerospace and Electronic Systems; Mar. 1982.

Severino et al.; "Performances of a Doppler Based Direct Passive Location Technique"; Proceedings of ESAV'08—Sep. 3-5; Capri, Italy.

Ho et al.; "Geolocation of a KNown Altitude Object from TDOA and FDOA Measurements"; IEEE Transactions on Aerospace and Electronic Systems; Jul. 1997.

International Search Report and Written Opinion mailed on Nov. 17, 2015 in corresponding International PCT Application No. PCT/US2015/021726, filed Mar. 20, 2015.

Ho et al., University of Saskatchenwan, "Geolocation of a Known Altitude Object from TDOA and FDOA Measurements", IEEE Trans on Aerospace and Electronic Systems, Jul. 1997.

Musicki & Koch, Fraunhover—FKIE (Germany) "Geolocation using TDOA and FDOA Measurements", IEEE Transactions on Signal Processing, Mar. 2010.

Musicki & Koch, Fraunhover—FKIE (Germany) "Mobile Emitter Geolocation and Tracking Using TDOA and FDOA Measurements", IEEE Transactions on Signal Processing, Mar. 2010.

Johnson, USN Naval Postgraduate School Thesis, "Implementing the Cross-Ambiguity Functions and Generating Geometry-Specific Signals", Sep. 2001.

Luo & Walker, Southern University Baton Rouge LA, "A New TDOA/FDOA—Based Recursive Geolocation Algorithm", 42nd South-Eastern Symposium on System Theory, Mar. 2010.

Shao, Kim, and You, Sungkyunkwan University, Korea, "TDOA/FDOA Geolocation with Adaptive Extended Kalman Filter", GDC/CA 2010, pp. 226-235, 2010.

Okello et al., U. Melbourne & DSTO, Australia, "Comparision of Recursive Algorithms for Emitter Localisation using TDOA Measurements from a Pair of UAVs" IEEE TransAerospace and Electronic System Jul. 2011.

Musicki & Evans, University of Melbourne, "Measurement Gaussian Sum Mixture Target Tracking", Ninth International Conference on Information Fusion, Florence, Italy Jul. 2006.

Semour Stein, Consultant, "Algorithms for Ambiguity Function Processing" IEEE Transactions on Acoustics, Speech, and Signal Processing, Jun. 1981.

* cited by examiner

DIRECT GEOLOCATION FROM TDOA, FDOA AND AGL

GOVERNMENT SUPPORT

This disclosure was supported, in whole or in part, by Contract No. FA8625-11-C-6600 awarded by the Department of Defense. The Government may have certain rights in the disclosure.

BACKGROUND

A location of a radio emitter can be determined by measuring a frequency difference of arrival (FDOA) of a radar pulse received by two radar pulse receivers separated by a fixed distance. FDOA is the difference in received frequency of the radar pulse between the two radar pulse receivers. The location of the radio emitter can also be determined by measuring a time difference of arrival (TDOA) of the radar pulse received by two radar pulse receivers. A TDOA method calculates the location using the difference in time of arrival of the radar pulse between the two radar pulse receivers. The radar pulse receivers can be on a moving platform such as an aircraft

SUMMARY

In accordance with an example, a method for estimating a location of a stationary emitter located on the Earth surface is provided. In an estimating engine provided with data collected during a plurality of time periods, the data including Time Difference of Arrival (TDOA) and Frequency Difference of Arrival (FDOA) measurements of a radar pulse sent from a stationary emitter located on the Earth surface and received by at least two antennas on an aircraft, and altitude measurements of the aircraft above the Earth surface, the method includes, for each of the plurality of time periods, estimating a location of the stationary emitter based on the TDOA, FDOA, altitude measurements associated with a respective time period. The result being an estimated location of the stationary emitter associated with the respective time period. The estimated location of the stationary emitter including a candidate longitude and a candidate latitude of the stationary emitter. The method further includes averaging the estimated locations associated with the plurality of time periods forming an averaged estimated location of the stationary emitter. The averaged estimated location including an average of the candidate longitudes and an average of the candidate latitudes of the stationary emitter. The method further includes providing the averaged estimated location of the stationary emitter.

In accordance with another example, a system for estimating a location of a stationary emitter located on the Earth surface is provided. The system includes memory having computer executable instructions thereupon and at least one interface receiving Time Difference of Arrival (TDOA) and Frequency Difference of Arrival (FDOA) measurements of a radar pulse sent from a stationary emitter located on the Earth surface and received by at least two antennas on an aircraft. The least one interface further receiving an altitude measurement of the aircraft above the Earth surface. The system further includes an estimating engine coupled to the memory and the at least one interface. The computer executable instructions when executed by the estimating engine cause the estimating engine to estimate for each of the plurality of time periods, a location of the stationary emitter based on the TDOA, FDOA, altitude measurements associated with a respective time period. The result being an estimated location of the stationary emitter associated with the respective time period. The estimated location of the stationary emitter including a candidate longitude and a candidate latitude of the stationary emitter. The estimating engine further caused to average the estimated locations associated with the plurality of time periods forming an averaged estimated location of the stationary emitter. The averaged estimated location including an average of the candidate longitudes and an average of the candidate latitudes of the stationary emitter. The estimating engine further caused to provide the averaged estimated location of the stationary emitter.

In accordance with yet another example, a tangible computer-readable storage medium having computer readable instructions stored therein for estimating a location of a stationary emitter located on the Earth surface is provided. Given data collected during a plurality of time periods including Time Difference of Arrival (TDOA) and Frequency Difference of Arrival (FDOA) measurements of a radar pulse sent from a stationary emitter located on the Earth surface and received by at least two antennas on an aircraft, and an altitude measurement of the aircraft above the Earth surface, the computer readable instructions when executed by one or more processors cause the one or more processors to estimate for each of the plurality of time periods, a location of the stationary emitter based on the TDOA, FDOA, altitude measurements associated with a respective time period. The result being an estimated location of the stationary emitter associated with the respective time period. The estimated location of the stationary emitter including a candidate longitude and a candidate latitude of the stationary emitter. The one or more processors further caused to average the estimated locations associated with the plurality of time periods forming an averaged estimated location of the stationary emitter. The averaged estimated location including an average of the candidate longitudes and an average of the candidate latitudes of the stationary emitter. The one or more processors further caused to provide the averaged estimated location of the stationary emitter.

In some examples, any of the aspects above can include one or more of the following features.

In other examples of the method, estimating includes representing each of the TDOA, FDOA, and altitude measurements as a surface in three dimensional space. The method further includes identifying an intersection of the surfaces, and based on the identification, returning each identified intersection as one of the estimated location of the stationary emitter.

In some examples of the method, each of the surfaces is described by a simultaneous equation and identifying the intersection of the surfaces includes solving the simultaneous equations using Laguerre's method.

In other examples of the method, estimating includes calculating two solutions for each of the estimated locations. Averaging includes maintaining a first averaged estimated location and a second averaged estimated location, each being a running average of the solutions calculated for the estimated locations. The examples further include associating each of the solutions with either the first or second averaged estimated location based on proximity of each of the solutions to either the first or second averaged estimated location. Providing includes selecting either the first or second averaged estimated location having a range to the aircraft closest in value to a computed range from the aircraft to the stationary emitter.

In some examples of the method, calculating the solutions includes identifying solutions that are consistent with locations on the Earth surface as valid solutions, and associating includes including the valid solutions in the first and second averaged estimated locations.

In other examples of the method, associating includes for each solution, determining whether a respective solution is closer in proximity to either the first or second averaged estimated location. These examples further include, based on the determination, including the respective solution in the running average of either the first or second averaged estimated location.

Other examples of the method further include determining the computed range from a ratio of effective radiated power of the stationary emitter to received power of the stationary emitter.

In some examples of the method, averaging includes assigning weights to each of the estimated locations based on an approximation of noise in the data collected during the plurality of time periods, and averaging the estimated locations according to the assigned weights resulting in a weighted-average estimated location of the stationary emitter.

In other examples of the method, providing includes providing the averaged estimated location of the stationary emitter to a user.

Some examples of the method further include computing a location of the stationary emitter on the Earth surface based on the averaged estimated location of the stationary emitter being provided.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

BRIEF DESCRIPTION OF THE DRAWINGS

The foregoing and other objects, features and advantages will be apparent from the following more particular description of the examples, as illustrated in the accompanying drawings in which like reference characters refer to the same parts throughout the different views. The drawings are not necessarily to scale, emphasis instead being placed upon illustrating the principles of the examples.

DETAILED DESCRIPTION

In the description that follows, like components have been given the same reference numerals, regardless of whether they are shown in different examples. To illustrate an example(s) of the present disclosure in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples.

Figure 1A:
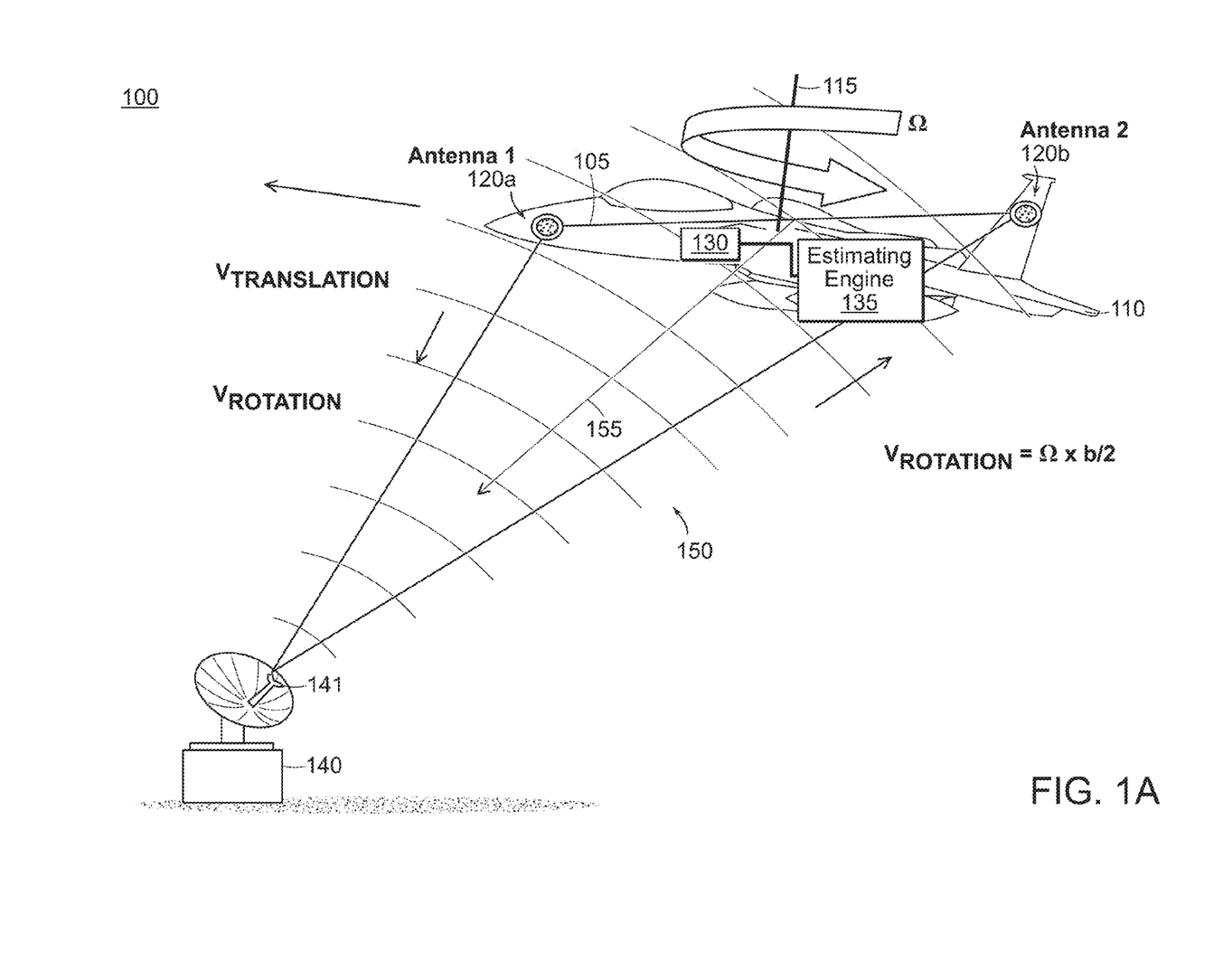
FIG. 1A is a schematic illustration of an environment in which an estimating engine of a mobile platform remotely tracks an object according to a direct geolocation approach.

FIG. 1A is a schematic illustration of an environment 100 in which a mobile platform 110 (e.g., a plane) remotely tracks a fixed object 140 (e.g., a remote emitter) using an estimating engine 135. In particular, the mobile platform 110 is configured for passive geolocation of the remote emitter 140 based on measured differential Doppler rates resulting from motion of the mobile platform 110 relative to the remote emitter 140.

The remote emitter 140 can be configured to emit electromagnetic radiation 150 predominantly in a preferred direction, for example, by way of a directional device, such as a directional antenna 141. The remote emitter 140 can pulse modulate the electromagnetic radiation 150 to form a pulse waveform. The mobile platform 110 may be illuminated by the electromagnetic radiation 150 periodically, for example, during periods in which the remote emitter scans a volume of space that includes the mobile platform 110. Such instances in which the mobile platform is illuminated by the electromagnetic energy are sometimes referred to as dwells.

In some embodiments, the remote emitter 140 can be sonic, as would be used by a sonar system. In other embodiments, the remote emitter 140 can be a reflector as used by a semi-active radar or ladar system that includes a transmitter. For example, a laser of a ladar system can direct laser energy toward the remote emitter 140. The remote emitter 140 then reflects the energy towards a target. In yet other embodiments, the remote emitter 140 can be a reflector that is illuminated by a radar or ladar transmitter on a different platform, and detected by passive sensors 120a-b. The remote emitter 140 can be, or include, an antenna that transmits RF (radio frequency) signals. It should be noted that the remote emitter 140, in some examples, can be a moving object (e.g., an aircraft or other moving remote emitter).

The mobile platform 110 receives (e.g., measures) emissions 150 (e.g., electromagnetic radiation) via the sensors 120a-b (e.g., a first antenna and a second antenna) from the remote emitter 140. As an example, tracking of the remote emitter 140 can be utilized in weapon targeting systems in order to locate and track movement of the remote emitter 140. As another example, tracking of the remote emitter 140 (e.g., rescue beacon, surveillance radar, cell phone, or tracking radar) can be utilized in order to facilitate search and rescue missions that require an accurate indication of the location of the remote emitter 140. In another example, tracking of the remote emitter 140 can be utilized in order to facilitate locating and destroying the remote emitter 140. Although the mobile platform 110 is illustrated as a plane, the mobile platform can be any type of a mobile vehicle (e.g., land-based, air-based, space-based, or sea-based). For instance, the mobile platform can be an aircraft, ship, missile, or spacecraft.

The sensors 120a-b are configured to capture at least a portion of the electromagnetic radiation 150. In an example, the first and second sensors 120a-b are separated by a straight line, referred to as a baseline 105. The mobile platform 110 is configured to perform spatial maneuvers while electromagnetic energy is being received by the sensors 120a-b. In this embodiment, the maneuver includes a rotation about an axis 115. Rotation of the mobile platform 110 about the axis 115 causes a distance between the remote emitter 140 and a first sensor 120a to change. For instance, if the mobile platform 110 rotates about the axis 115 in a clockwise direction (as shown), the first antenna (first sensor) 120a turns away from the remote emitter 140, while the second antenna (second sensor) 120b turns towards the remote emitter 140. In at least some embodiments, such rotational maneuvers can occur while the platform is also moving in a translational sense, with respect to the remote emitter 140 (e.g., from right to left in the figure). Alternatively or in addition, the platform itself can be positioned with a respective pitch, roll and yaw, one or more of which may also vary during a maneuver.

In these embodiments, the sensors 120a-b can be passive sensors that receive radiation but do not transmit radiation. Passive sensing has the advantage of being simple, allowing for clandestine operation, requiring low power, and also can be implemented with only firmware and software changes to existing radar warning receiver equipment or other similar surveillance equipment. It should also be noted that, while two sensors 120a-b are depicted, three or more sensors can be employed.

As stated above, the sensors 120a-b receive emissions 150 (e.g., electromagnetic radiation) from the remote emitter 140. In response to receiving the electromagnetic radiation 150, the mobile platform 110 processes the received emissions 150 to determine a geolocation of the remote emitter 140. In an example, the mobile platform 110 determines the geolocation of the remote emitter 140 by determining a frequency-difference-of arrival (FDOA) of the signals received by the pair of sensors. The mobile platform 110 determines the FDOA by measuring a differential Doppler phase rate between the signals received by the pair of sensors 120a-b. In another example, the mobile platform 110 determines the geolocation of the remote emitter 140 by determining a time difference of arrival (TDOA) between the signals received by the sensors 120a-b. In yet another example, the mobile platform 110 determines both FDOA and TDOA as two measures of the same waveform. For instance, both FDOA and TDOA are determined from the same sample of the signal received by the sensors 120a-b.

Figure 1B:
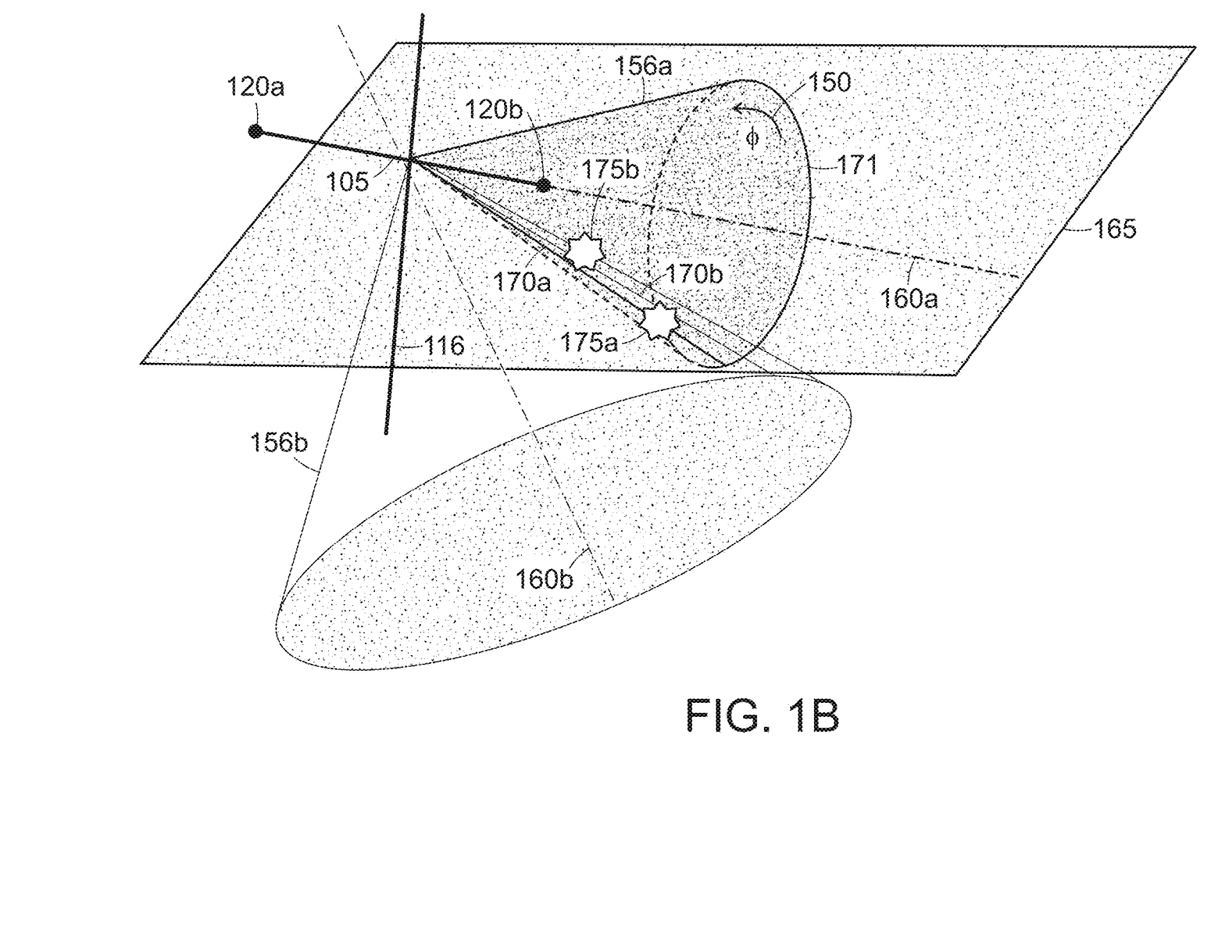
FIG. 1B is a graphical illustration of a time difference arrival (TDOA) cone and frequency difference of arrival (FDOA) cone used to estimate a geolocation of a remote emitter.

As illustrated, the mobile platform 110 includes an inertial navigation system 130 that determines, among other things, the altitude of the mobile platform 110 above the ground or "AGL." Using information corresponding to the AGL of the mobile platform and the FDOA/TDOA information determined by the mobile platform 110, the estimating engine 135 estimates a geolocation of the remote emitter 140, as described in greater detail below. FIG. 1B is a graphical illustration of a time difference arrival (TDOA) cone 156a derived from the determined TDOA of a radar signal and frequency difference of arrival (FDOA) cone 156b derived from the determined FDOA of the radar signal 150 that can be used to determine or estimate a geolocation of the remote emitter 140.

A single TDOA measurement places the emitter 140 on the TDOA cone 156a, whose axis is along the baseline 105 connecting the antennas 120a-b. In particular, the TDOA measurements indicate that the emitter 140 is located somewhere on an arc 171 where the TDOA cone 156a intersects the surface of the Earth 165. As the platform 110 flies and maneuvers around axis 116, the TDOA cone 156a and the corresponding arc 171 on the Earth shifts slightly. According to some geolocation approaches, the location of the emitter 140 can then be determined by a best fit to the series of TDOA measurements.

A similar method can be used to determine a location of the emitter 140 by using an FDOA cone 156b derived from an FDOA measurement. As the platform 110 flies and maneuvers around axis 116, a series of FDOA measurements are used to derive an approximate FDOA cone. The possible geolocation of the emitter 140 lies along the approximate FDOA cone, whose axis 160b is perpendicular to the TDOA cone 156a. The TDOA and FDOA measure two independent quantities. This can greatly speeds the convergence of the best fit to an emitter location in some geolocation approaches Traditional geolocation approaches using TDOA and FDOA measurements are unreliable due to the inability to generate a good initial estimate. For example, noise in the TDOA and FDOA measurements hinders the calculation of a good initial estimate. Iterative minimum error approaches can correct for a bad seed value but diverge when the underlying error surface is rough, which often is the case. Therefore, there is a need to estimate the location of a remote emitter directly from TDOA and FDOA measurements without an initial seed. There is a further need to provide an estimated location despite noise in the TDOA and FDOA measurements.

Accordingly, a direct geolocation approach is provided herein to address the foregoing needs and others as well. The direct geolocation approach and its examples described herein generate a candidate latitude and longitude of an emitter, directly, without a seed. Each TDOA and FDOA measurement pair determines a location. In the approach, the average (mean) over a moderately small set of data converges rapidly despite large variations due to noise in the TDOA and FDOA measurements. In the direct geolocation approach, the altitude of the emitter is estimated instead of a three-dimensional seed value. The altitude of the emitter is far better known than the latitude and longitude of the emitter.

Figure 2:
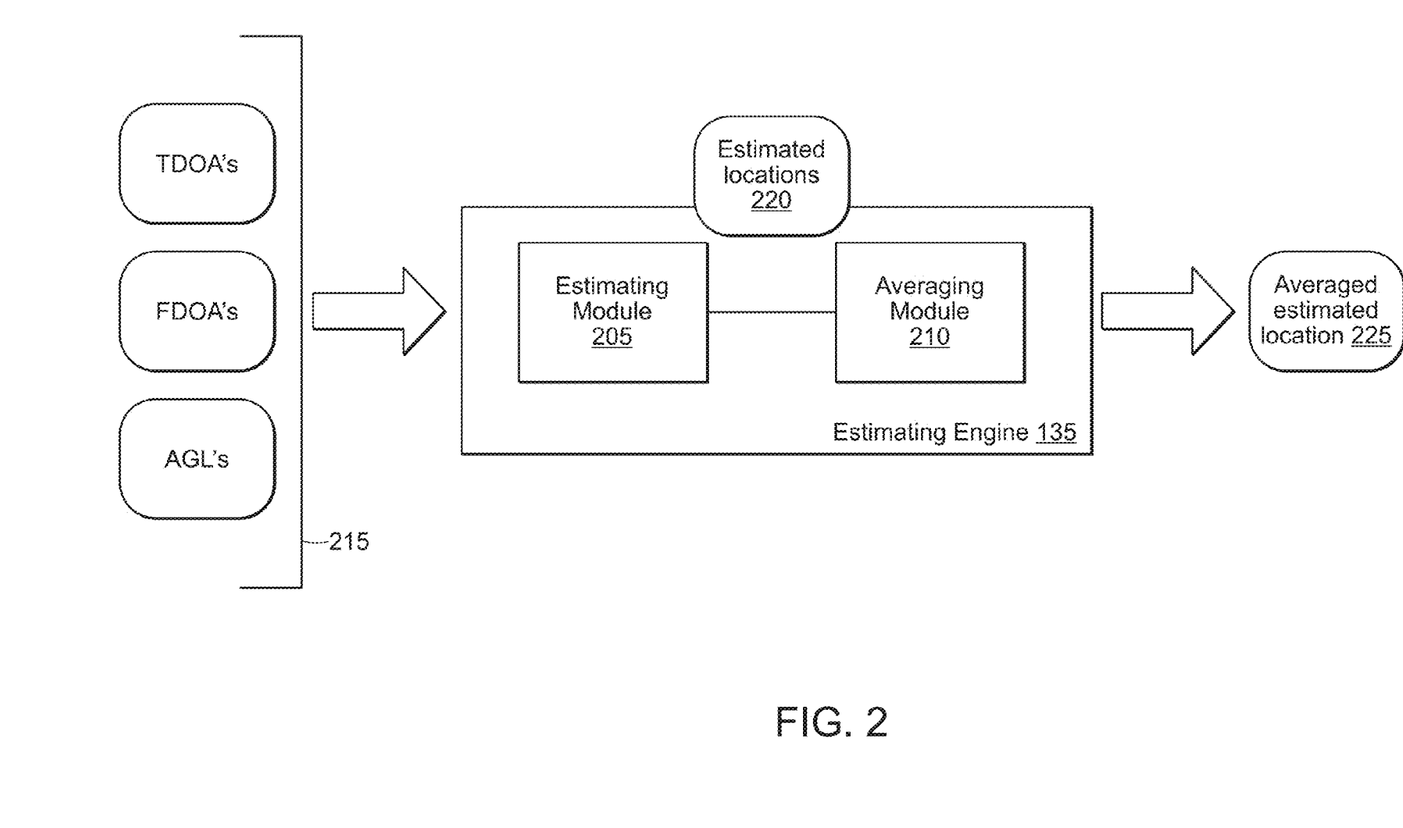
FIG. 2 is a functional block diagram of an example of the estimating engine implementing examples of the direct geolocation approach, in which TDOA and FDOA measurements may include noise as well as values for these measurements.

FIG. 2 shows an example of the estimating engine 135 and its operation is described with reference to FIG. 3. The estimating engine 135 includes estimating module 205 and an averaging module 210 communicatively coupled as shown. As the aircraft flies along a flight path, a stationary emitter located on the surface of the Earth (shown in FIG. 3 as origin 0,0) emits electromagnetic energy in an effort to find the aircraft. The aircraft is illuminated by the electromagnetic energy during periods of time called dwells. During each dwell, the TDOA and FDOA of the electromagnetic energy are measured.

TDOA and FDOA measurements as well as the altitude of the aircraft above ground (AGL) during the dwells are collected over a plurality of time periods corresponding to the dwells. Data collected over the plurality of time periods, referred to as a "data collect" 215, including the TDOA, FDOA, and AGL measurements, is provided to the estimating engine 135. For each data collect 215, the estimating module 205 estimates a location of the stationary emitter based on the TDOA, FDOA, and AGL measurements.

Each of the TDOA, FDOA, and AGL measurements defines a surface in three dimensional space on which the emitter may be located. With reference to FIG. 1B, each point on the surface of the TDOA cone 156a defined by the measured TDOA is a possible location of the emitter having the measured TDOA. The FDOA cone 156b defined by the FDOA measurement and the surface of the Earth (i.e., ground) 165 defined by the AGL measurement, similarly, represent possible locations of the emitter.

When an RF signal emanates from an emitter on the ground, the TDOA cone 156a and FDOA code 156b are expected to intersect in two lines 170a and 170b, each representing a line-of-sight of the emitter. Generally, the two lines 170a and 170b intersect the ground 165 at two solution points 175a and 175b, each representing a possible (candidate) location of the emitter. The emitter is expected to be at the location represented by either the solution point 175a or solution point 175b. In some cases, however, the two lines 170a and 170b do not intersect the ground 165. In these cases, there are no solution points. A convenient technique for finding the intersection and apparent location of an emitter is discussed below in detail.

Equations 1, 2, and 3, below, describe the three surfaces representing the TDOA, FDOA, and AGL measurements. As used herein, vectors are denoted by an arrow above the symbol, i.e. $\vec{b}$ and unit vectors are denoted by a carat above the symbol, i.e. $\hat{b} = \vec{b}/b$. The scalar product between two vectors is denoted by $\vec{a} \cdot \vec{b}$ and the vector product by $\vec{a} \times \vec{b}$.

$$c\Delta T/b = -\hat{r} \cdot \hat{b} \equiv \sin \gamma \quad \text{Equation 1}$$

where $\vec{b}$ is the baseline vector from one antenna to another, and $\gamma$ is the angle between the perpendicular to the baseline and the line of sight.

$$\frac{c}{b}\frac{\Delta T}{dt} = \hat{r} \cdot \left[\left(\frac{\vec{v} \times \hat{r}}{r} - \vec{\omega}\right) \times \hat{b}\right]. \quad \text{Equation 2}$$

where $-\vec{v} \times \hat{r}/r$ is the angular velocity of the aircraft flying around the emitter with lever arm, r, while $\vec{\omega}$ is the angular velocity of the aircraft about its own center.

$$r = r_a \sin \epsilon - \sqrt{r_a^2 \sin^2 \epsilon - (r_a^2 - r_e^2)} \quad \text{Equation 3}$$

where the line-of-sight distance r is expressed as a function of the elevation angle $\epsilon$.

In the convenient example, the foregoing relationship between Equations 1, 2, and 3 is expressed by combing them into a single equation provided below, Equation 4.

$$w \equiv \frac{c r_H}{b c \cos\gamma} \frac{d\Delta T}{dt} = \quad \text{Equation 4}$$

$$\frac{r_H}{v}\frac{d\gamma}{dt} = \frac{r_H(\hat{v} \cdot \hat{b} - (\hat{v} \cdot \hat{r})(\hat{r} \cdot \hat{b}))}{r\cos\gamma} - \frac{r_H}{vb\cos\gamma}\hat{r} \cdot \frac{d\vec{b}}{dt}.$$

Equation 4 is reduced to an equation with one unknown using an appropriate coordinate basis set closely related to the measured quantities TDOA, FDOA, and AGL. The result is Equation 5.

$$w = \frac{r_H(b_1 \tan\gamma - b_2\cos\phi - b_3\sin\phi)}{vb} + \quad \text{Equation 5}$$

$$\frac{\sin\epsilon_H(v_1\cos\gamma + v_2\sin\gamma\cos\phi + v_3\sin\gamma\sin\phi)}{v\left(\sin\epsilon - \sqrt{\sin^2\epsilon - \sin^2\epsilon_H}\right)}.$$

where $\phi$ represents the angle 180 around the TDOA cone 156a of FIG. 1B and is unknown. Equation 5 is then transformed into a polynomial in sin $\phi$. The result is Equation 6, which is an equation for the roots of a polynomial of degree 6 in s.

$$Kd(s) = G^2(s) - (1-s^2)H^2(s) = P_6(\vec{k}, s) = 0 \quad \text{Equation 6.}$$

where $\vec{k} = \vec{g} \otimes \vec{g} + [\vec{h} \otimes \vec{h}, 0, 0] - [0, 0, \vec{h} \otimes \vec{h}]$ A convenient example of the direct geolocation approach uses Laguerre's method to find the 6 roots. Generally, there are two such solutions but there may be one or none, depending on how and if the three surfaces intersect.

The forgoing technique results in an estimated location 220 of the stationary emitter during the time period associated with the data collect 215. The estimated location 220 includes a possible (candidate) longitude and possible (candidate) latitude of the stationary emitter. FIG. 3 shows the estimated locations (results) of 30 data collects, each represented as a "+." (FIG. 3 also shows spurious results of the estimation, which will be discussed later.)

Figure 3:
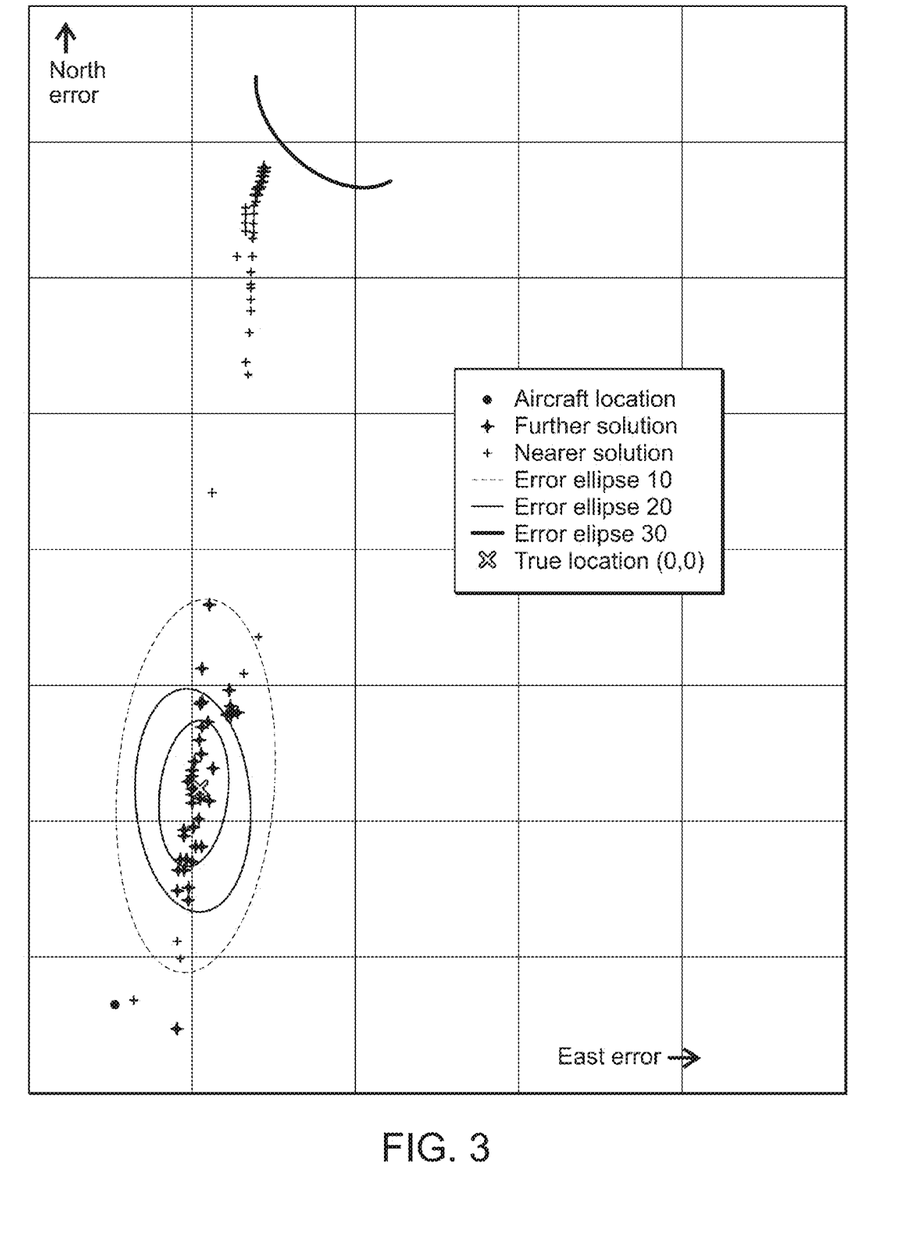
FIG. 3 is a chart showing estimated locations and average estimated locations of stationary emitted determined according to an example of the direct geolocation approach.

FIG. 3 shows a considerable spread in the estimated location computed from each data collect. This is due to measurement noise in both the TDOA and FDOA measurements, and in the dynamics of antenna motion. To mitigate the effect of noise, the averaging module 210 averages the estimated locations. A resulting averaged estimated location 225 is shown in FIG. 3 as an error ellipse. As the number of data collects increases from which to compute estimated locations, the averaged estimated location 225 converges on the true location of the stationary emitter (shown in FIG. 4 as error ellipse for 30 data collects is smaller than an error ellipse for 20 data collects). The estimating engine 135 then provides the average estimated location.

One advantage to the direct geolocation approach is that the location of a stationary emitter is estimated without an initial estimate or "seed." Conventional geolocation techniques, on the other hand, require a seed. Without a "good" seed or a seed at all, these techniques may fail to converge, converge very slowly, or converge to a false answer.

In a convenient example of the estimating engine 135, the estimating engine 135 further calculates the location of the stationary emitter based on the provided averaged estimated location 225. In another example, the averaged estimated location 225 is provided as a seed to another process, such as one used in a conventional geolocation technique, to calculate the location of the stationary emitter. In yet another example, the estimating engine 135 provides the averaged estimated location 225 to a user, for example, as a visual/and or audio indicator or warning.

Figure 4:
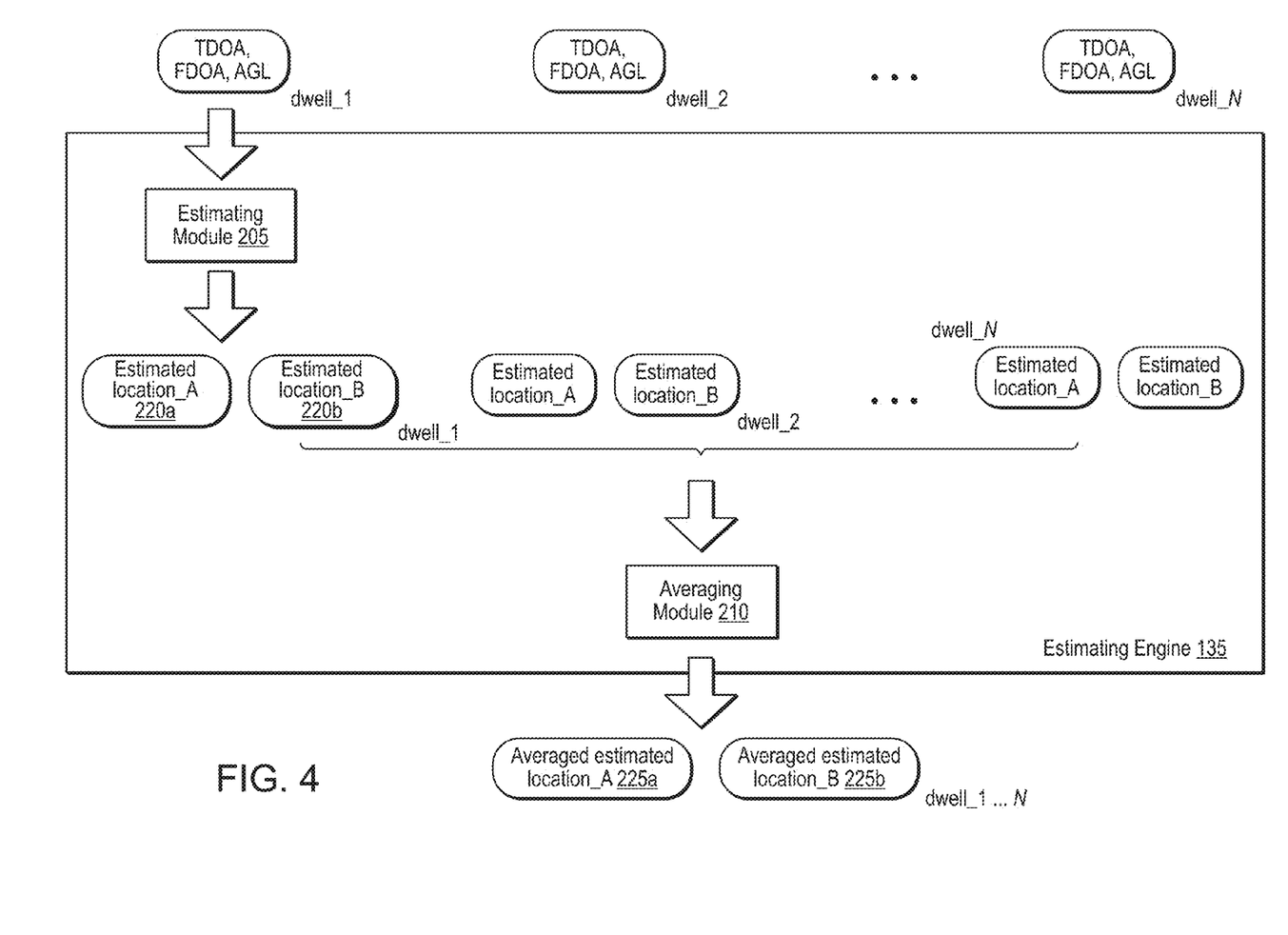
FIG. 4 is a functional block diagram of another example of the estimating engine implement examples of the direct geolocation approach.

FIG. 4 shows a convenient example of the estimating engine 135. As an overview to its operation, the estimating engine 135 computes one or two acceptable estimated locations (solutions) for each dwell. As the estimated locations are computed, the estimating engine 135 uses a dual-hypothesis tracker to associate an estimated location with one of two averaged estimated locations to which it is closest in proximity. The estimating engine 135 associates the remaining estimated location with the other averaged estimated location. After several dwells, the estimating engine 135 chooses the averaged estimated location whose range to the aircraft is closest to a range computed from a ratio of effective radiated power (ERP) of the stationary emitter to received power (RP) of the stationary emitter.

In more detail, to compute an estimated location for a given data collect, the estimating module 205 computes two solutions. For example, for the data collect labeled "dwell_1," the estimating module 205 computes estimated location 220a and estimated location 220b. One example of the estimating module 205 determines whether each computed solution is consistent with a location on the Earth surface. The estimating module 205 identifies those solutions that are consistent with locations on the Earth surface as valid solutions. The estimating engine 135 considers valid solutions in determining the average estimated location. Therefore, in some instances, the estimating engine 135 computes one estimated location for a dwell.

For purpose of discussion, assume the estimating module 205 computes two solutions. One solution is closer to the aircraft than the other solution. As such, it may be convenient to call one solution the "near solution," and the other the "far solution." The averaging module 210 maintains a first average estimated location 225a and second average estimated location 225b. Each is a running average of the solutions calculated for the estimated locations. The averaging module 210 associates each of the solutions (220a, 220b) with either the first average estimated location 225a or second average estimated location 225b based on proximity of each of the solutions to either the first or second average estimated location.

For example, the averaging module 210 determines whether the near solution is closer to the first averaged estimated location 225a or the second averaged estimated location 225b. If the near solution is closer to the first averaged estimated location 225a, then the average module includes the near solution with the first averaged estimated location 225a. In doing so, the first average estimated location 225a is the running average of all near solutions computed so far. And similarly, the second average estimated location 225b is the running average of all far solutions computed so far. Keeping a running average is computationally convenient. In other examples, the estimated locations are saved individually and then averaged in bulk.

A method of the direct geolocation approach in accordance with the foregoing description will now be described with respect to the flowcharts in FIGS. 5A-5D. Initially, step 504, during a plurality of time periods, data including TDOA and FDOA measurements of a radar pulse sent from an emitter, and altitude measurements, are collected on an aircraft. Subsequently, step 508, it is estimated, for each of the time periods, a location of the emitter based on the TDOA, FDOA, altitude measurements associated with the respective time period, resulting in an estimated location of the emitter for the respective time period. The estimated location includes a candidate longitude and latitude of the emitter. The estimated locations associated with the time periods are averaged to form an averaged estimated location of the emitter, step 512. The averaged estimated location includes an average of the candidate longitudes and an average of the candidate latitudes. In step 516 the averaged estimated location of the emitter is provided, for example, to a user. Further, a location of the emitter on the Earth surface is computed based on the provided averaged estimated location of the emitter at step 520.

Figure 5A:
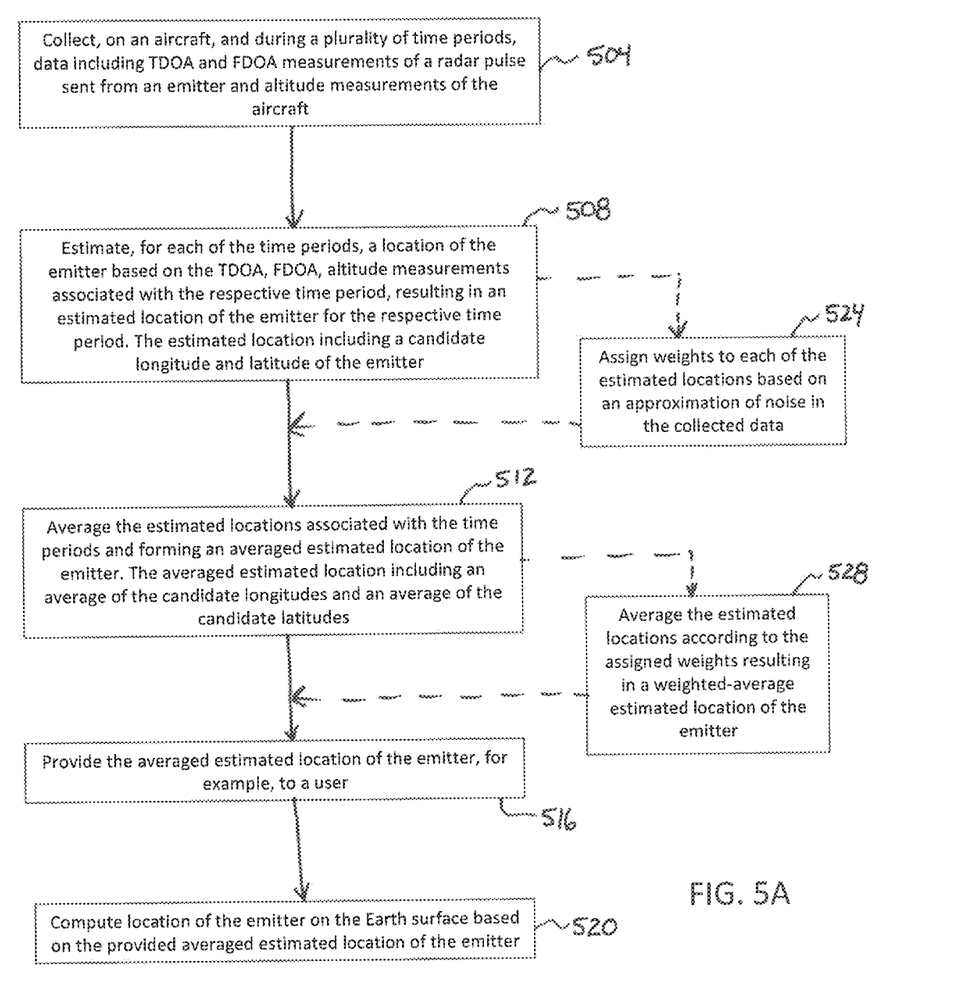
FIGS. 5A-5D are flowcharts of examples of a method of the direct geolocation approach as implemented by the estimating engine.

Returning to step 508, optionally and in addition, weights can be assigned to each of the estimated locations based on an approximation of noise in the collected data as per step 524. Further, step 528, the estimated locations can then be averaged according to the assigned weights resulting in a weighted-average estimated location of the emitter.

Figure 5B:
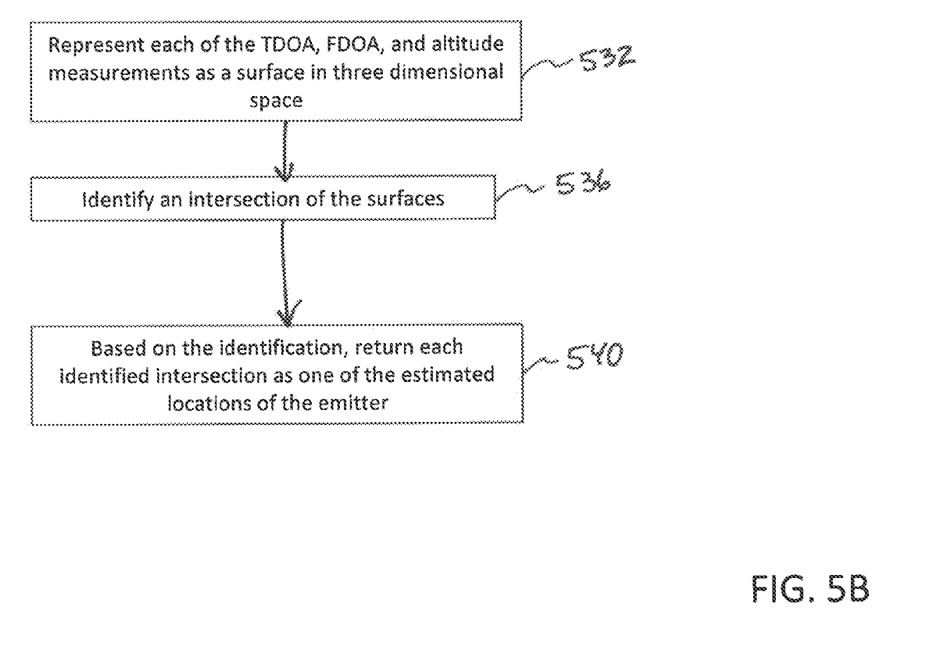

The estimating in step 508 may include representing each of the TDOA, FDOA, and altitude measurements as a surface in three dimensional space, per step 532 as shown in FIG. 5B, and subsequently identifying an intersection of the surfaces, step 536, and based on the identification, return each identified intersection as one of the estimated locations of the emitter, step 540.

Figure 5C:
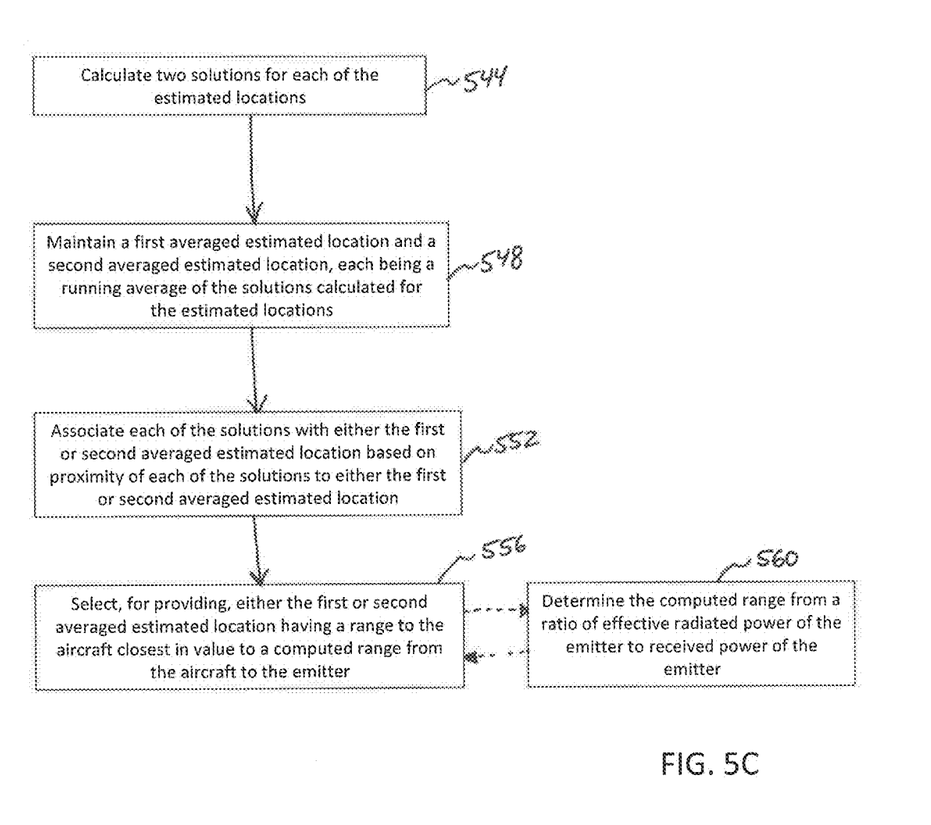

As shown in FIG. 5C, the estimating in step 508 may alternately include calculating two solutions for each of the estimated locations, step 544, and the averaging in step 512 may then include maintaining a first averaged estimated location and a second averaged estimated location, each being a running average of the solutions calculated for the estimated locations, per step 548, and then associating each of the solutions with either the first or second averaged estimated location based on proximity of each of the solutions to either the first or second averaged estimated location, per step 552. Subsequently, the method would then include selecting, for providing to the user in step 516, either the first or second averaged estimated location having a range to the aircraft closest in value to a computed range from the aircraft to the emitter, step 556. The computed range may be determined from a ratio of effective radiated power of the emitter to received power of the emitter, per step 560.

Figure 5D:
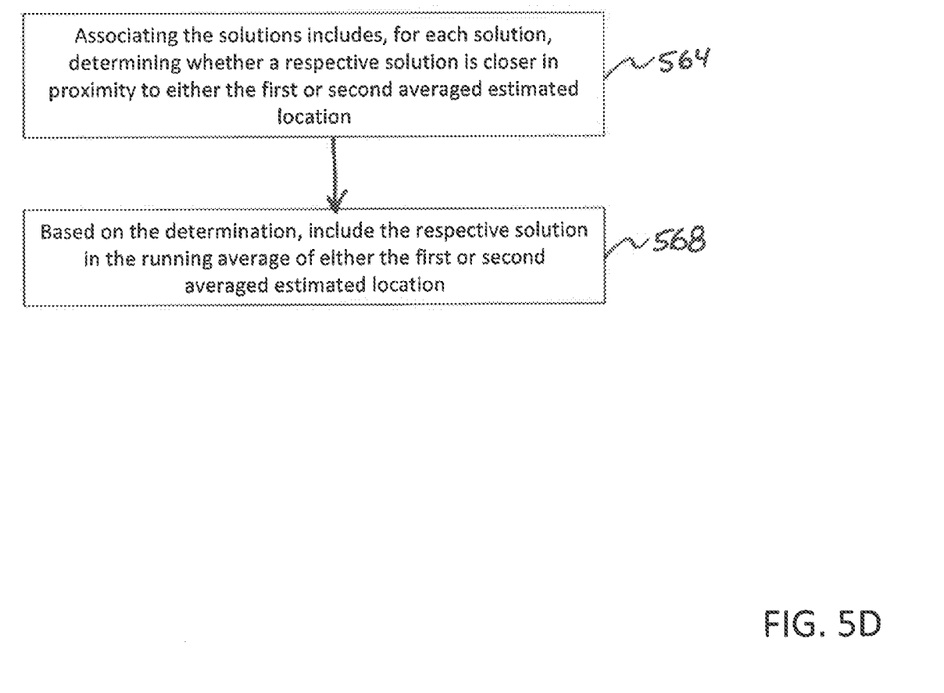

Additionally, as shown in FIG. 5D, the associating step 552 may include, for each solution, determining whether a respective solution is closer in proximity to either the first or second averaged estimated location, per step 564 and then, based on the determination, include the respective solution in the running average of either the first or second averaged estimated location, step 568.

The above-described systems and methods can be implemented in digital electronic circuitry, in computer hardware, firmware, and/or software. The implementation can be as a computer program product (i.e., a computer program tangibly embodied in an information carrier medium). The implementation can, for example, be in a machine-readable storage device for execution by, or to control the operation of, data processing apparatus. The implementation can, for example, be a programmable processor, a computer, and/or multiple computers.

In one example, a computer program can be written in any form of programming language, including compiled and/or interpreted languages, and the computer program can be deployed in any form, including as a stand-alone program or as a subroutine, element, and/or other unit suitable for use in a computing environment to carry out the features and functions of various examples discussed herein. A computer program can be deployed to be executed on one computer or on multiple computers at one site.

Method steps or operations can be performed as processes by one or more programmable processors executing a computer program to perform functions of various examples by operating on input data and generating output. Method steps can also be performed by and an apparatus can be implemented as special purpose logic circuitry. The circuitry can, for example, be a field programmable gate array (FPGA) and/or an application specific integrated circuit (ASIC). Modules, subroutines, and software agents can refer to portions of the computer program, the processor, the special circuitry, software, and/or hardware that implements that functionality.

The estimating engine 135 may comprise one or more processors suitable for the execution of a computer program include, by way of example, both general and special purpose microprocessors, and any one or more processors of any kind of digital computer. Generally, a processor receives instructions and data from a read-only memory or a random access memory or both. The elements of a computer may comprise a processor for executing instructions and one or more memory devices for storing instructions and data. Generally, a computer can include, can be operatively coupled to receive data from and/or transfer data to one or more mass storage devices (e.g., a memory module) for storing data (e.g., magnetic, magneto-optical disks, or optical disks). The memory may be a tangible non-transitory computer-readable storage medium having computer-readable instructions stored therein for processing images, which when executed by one or more processors (e.g., estimating engine 135) cause the one or more processors to carry out or implement the features and functionalities of various examples discussed herein.

Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computing device having a display device. The display device can, for example, be a cathode ray tube (CRT) and/or a liquid crystal display (LCD) monitor, and/or a light emitting diode (LED) monitor. The interaction with a user can, for example, be a display of information to the user and a keyboard and a pointing device (e.g., a mouse or a trackball) by which the user can provide input to the computing device (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described systems and techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computing device having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system may be coupled to and/or include clients and servers. A client and a server are generally remote from each other and typically interact through a communication network. The relationship of client and server arises by virtue of computer programs running on the respective computing devices and having a client-server relationship to each other.

Communication networks may include packet-based networks, which can include, for example, the Internet, a carrier internet protocol (IP) network (e.g., local area network (LAN), wide area network (WAN), wireless network (e.g., radio access network (RAN), 802.11 network, 802.16 network, general packet radio service (GPRS) network, HiperLAN), and/or other packet-based networks. Circuit-based networks may include, for example, a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The estimating engine 135 may include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., INTERNET EXPLORER® available from Microsoft Corporation, of Redmond, Wash.). The mobile computing device includes, for example, a BLACKBERRY® provided by Research In Motion Limited of Waterloo, Ontario, Canada.

"Comprise," "include," and/or plural forms of each are open ended and include the listed parts and can include additional parts that are not listed. "And/or" is open ended and includes one or more of the listed parts and combinations of the listed parts.

Although the above disclosure discusses what is currently considered to be a variety of useful examples, it is to be understood that such detail is solely for that purpose, and that the appended claims are not limited to the disclosed examples, but, on the contrary, are intended to cover modifications and equivalent arrangements that are within the spirit and scope of the appended claims.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A method for estimating a location of a stationary emitter located on the Earth surface, the method comprising:
   collecting data during a plurality of time periods, the data including Time Difference of Arrival (TDOA) and Frequency Difference of Arrival (FDOA) measurements of a radar pulse sent from a stationary emitter located on the Earth surface and received by at least two antennas on an aircraft, and altitude measurements of the aircraft above the Earth surface;
   for each of the plurality of time periods, estimating a location of the stationary emitter based on the TDOA, FDOA, and altitude measurements associated with a respective time period, the result being an estimated location of the stationary emitter associated with the respective time period, the estimated location of the stationary emitter including a candidate longitude and a candidate latitude of the stationary emitter;

averaging the estimated locations associated with the plurality of time periods forming an averaged estimated location of the stationary emitter, the averaged estimated location including an average of the candidate longitudes and an average of the candidate latitudes of the stationary emitter; and providing the averaged estimated location of the stationary emitter, wherein estimating includes calculating two solutions for each of the estimated locations, wherein averaging includes maintaining a first averaged estimated location and a second averaged estimated location, each being a running average of the solutions calculated for the estimated locations, and associating each of the solutions with either the first or second averaged estimated location based on proximity of each of the solutions to either the first or second averaged estimated location, and wherein providing includes selecting either the first or second averaged estimated location having a range to the aircraft closest in value to a computed range from the aircraft to the stationary emitter.

2. The method of claim 1 wherein estimating includes representing each of the TDOA, FDOA, and altitude measurements as a surface in three dimensional space;

identifying an intersection of the surfaces; and based on the identification, returning each identified intersection as one of the estimated location of the stationary emitter.

3. The method of claim 2 wherein each of the surfaces is described by a simultaneous equation; and wherein identifying includes solving the simultaneous equations using Laguerre's method.

4. The method of claim 1 wherein calculating the solutions includes identifying solutions that are consistent with locations on the Earth surface as valid solutions; and wherein associating includes including the valid solutions in the first and second averaged estimated locations.

5. The method of claim 1 wherein associating includes for each solution, determining whether a respective solution is closer in proximity to either the first or second averaged estimated location; and based on the determination, including the respective solution in the running average of either the first or second averaged estimated location.

6. The method of claim 5 further comprising determining the computed range from a ratio of effective radiated power of the stationary emitter to received power of the stationary emitter.

7. The method of claim 1 wherein averaging includes assigning weights to each of the estimated locations based on an approximation of noise in the data collected during the plurality of time periods; and averaging the estimated locations according to the assigned weights resulting in a weighted-average estimated location of the stationary emitter.

8. The method of claim 1 wherein providing includes providing the averaged estimated location of the stationary emitter to a user.

9. The method of claim 1 further comprising computing a location of the stationary emitter on the Earth surface based on the averaged estimated location of the stationary emitter being provided.

10. A system for estimating a location of a stationary emitter located on the Earth surface, the system comprising:

a memory having computer executable instructions thereupon;

at least one interface receiving Time Difference of Arrival (TDOA) and Frequency Difference of Arrival (FDOA) measurements of a radar pulse sent from a stationary emitter located on the Earth surface and received by at least two antennas on an aircraft, and receiving an altitude measurement of the aircraft above the Earth surface;

an estimating engine coupled to the memory and the at least one interface, the computer executable instructions when executed by the estimating engine cause the estimating engine to:

for each of the plurality of time periods, estimate a location of the stationary emitter based on the TDOA, FDOA, and altitude measurements associated with a respective time period, the result being an estimated location of the stationary emitter associated with the respective time period, the estimated location of the stationary emitter including a candidate longitude and a candidate latitude of the stationary emitter;

average the estimated locations associated with the plurality of time periods forming an averaged estimated location of the stationary emitter, the averaged estimated location including an average of the candidate longitudes and an average of the candidate latitudes of the stationary emitter; and provide the averaged estimated location of the stationary emitter, wherein estimating includes calculating two solutions for each of the estimated locations, wherein averaging includes maintaining a first averaged estimated location and a second averaged estimated location, each being a running average of the solutions calculated for the estimated locations, and associating each of the solutions with either the first or second averaged estimated location based on proximity of each of the solutions to either the first or second averaged estimated location, and wherein providing includes selecting either the first or second averaged estimated location having a range to the aircraft closest in value to a computed range from the aircraft to the stationary emitter.

11. A tangible non-transitory computer-readable storage medium having computer readable instructions stored therein for estimating a location of a stationary emitter located on the Earth surface, which when executed by one or more processors cause the one or more processors, given data collected during a plurality of time periods including Time Difference of Arrival (TDOA) and Frequency Difference of Arrival (FDOA) measurements of a radar pulse sent from a stationary emitter located on the Earth surface and received by at least two antennas on an aircraft, and an altitude measurement of the aircraft above the Earth surface, to:

for each of the plurality of time periods, estimate a location of the stationary emitter based on the TDOA, FDOA, and altitude measurements associated with a respective time period, the result being an estimated location of the stationary emitter associated with the respective time period, the estimated location of the stationary emitter including a candidate longitude and a candidate latitude of the stationary emitter;

average the estimated locations associated with the plurality of time periods forming an averaged estimated location of the stationary emitter, the averaged estimated location including an average of the candidate longitudes and an average of the candidate latitudes of the stationary emitter; and provide the averaged estimated location of the stationary emitter, wherein estimating includes calculating two solutions for each of the estimated locations, wherein averaging includes maintaining a first averaged estimated location and a second averaged estimated location, each being a running average of the solutions calculated for the estimated locations, and associating each of the solutions with either the first or second averaged estimated location based on proximity of each of the solutions to either the first or second averaged estimated location, and wherein providing includes selecting either the first or second averaged estimated location having a range to the aircraft closest in value to a computed range from the aircraft to the stationary emitter.

12. The method of claim 10 wherein calculating the solutions includes identifying solutions that are consistent with locations on the Earth surface as valid solutions; and wherein associating includes including the valid solutions in the first and second averaged estimated locations.

13. The system of claim 10 wherein associating includes for each solution, determining whether a respective solution is closer in proximity to either the first or second averaged estimated location; and based on the determination, including the respective solution in the running average of either the first or second averaged estimated location.

14. The system of claim 13 wherein the computed range is determined from a ratio of effective radiated power of the stationary emitter to received power of the stationary emitter.

15. The tangible non-transitory computer-readable storage medium of claim 11 further comprising computer readable instructions stored therein wherein calculating the solutions includes identifying solutions that are consistent with locations on the Earth surface as valid solutions; and wherein associating includes including the valid solutions in the first and second averaged estimated locations.

16. The tangible non-transitory computer-readable storage medium of claim 11 further comprising computer readable instructions stored therein wherein associating includes for each solution, determining whether a respective solution is closer in proximity to either the first or second averaged estimated location; and based on the determination, including the respective solution in the running average of either the first or second averaged estimated location.

17. The tangible non-transitory computer-readable storage medium of claim 16 further comprising computer readable instructions stored therein wherein the computed range is determined from a ratio of effective radiated power of the stationary emitter to received power of the stationary emitter.

* * * * *